(12) United States Patent
Chan

(10) Patent No.: US 12,132,389 B2
(45) Date of Patent: Oct. 29, 2024

(54) RESONANCE CONVERSION DEVICE

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 244 days.

(21) Appl. No.: 17/969,642

(22) Filed: Oct. 19, 2022

(65) Prior Publication Data

US 2023/0155477 A1 May 18, 2023

(30) Foreign Application Priority Data

Nov. 16, 2021 (TW) ................. 110142627

(51) Int. Cl.
*H02M 1/36* (2007.01)
*H02M 1/00* (2006.01)
*H02M 1/088* (2006.01)

(52) U.S. Cl.
CPC ......... *H02M 1/0058* (2021.05); *H02M 1/088* (2013.01); *H02M 1/36* (2013.01)

(58) Field of Classification Search
CPC ....... H02M 1/0058; H02M 1/088; H02M 1/36
See application file for complete search history.

(56) References Cited

U.S. PATENT DOCUMENTS

| | | | | |
|---|---|---|---|---|
| 7,330,365 B2* | 2/2008 | Usui | ................. | H02M 3/33571 363/89 |
| 7,599,198 B2* | 10/2009 | Tao | .................... | H02M 3/3376 363/21.06 |
| 10,615,700 B1* | 4/2020 | Moon | ................. | H02M 3/3376 |
| 10,770,979 B2* | 9/2020 | Sato | ........................ | H02M 1/32 |
| 11,967,906 B2* | 4/2024 | Wen | ..................... | H02M 1/0095 |
| 2019/0157965 A1* | 5/2019 | Choi | ....................... | H02M 1/08 |

FOREIGN PATENT DOCUMENTS

| | | |
|---|---|---|
| CN | 106602881 | 4/2017 |
| CN | 111865091 | 10/2020 |
| TW | 200814503 | 3/2008 |
| TW | 201545454 | 12/2015 |
| TW | 201720036 | 6/2017 |
| TW | 201914187 | 4/2019 |
| TW | 201947863 | 12/2019 |

* cited by examiner

*Primary Examiner* — Adolf D Berhane

(74) *Attorney, Agent, or Firm* — JCIPRNET

(57) ABSTRACT

A resonance conversion device including an LLC synchronous resonance converter, a synchronous rectification controller, and a dead time adjustment circuit is provided. The LLC synchronous resonance converter includes a resonance tank and multiple synchronous rectification switches. The synchronous rectification controller controls the synchronous rectification switches, which are turned on with a delay based on a dead time length. The dead time adjustment circuit inductively couples electric energy at an output of the LLC synchronous resonance converter to the resonance tank, and provides a dead time control signal according to a resonance voltage variation of the resonance tank so that the synchronous rectification controller adjusts the dead time length according to the dead time control signal.

10 Claims, 5 Drawing Sheets

RESONANCE CONVERSION DEVICE

CROSS-REFERENCE TO RELATED APPLICATION

This application claims the priority benefit of Taiwan application serial no. 110142627, filed on Nov. 16, 2021. The entirety of the above-mentioned patent application is hereby incorporated by reference herein and made a part of this specification.

BACKGROUND

Technical Field

The disclosure relates to a resonance conversion device, and more particularly to a resonance conversion device capable of achieving zero current cutoff under different loads.

Description of Related Art

An LLC resonance converter has the advantages of soft switching and high conversion efficiency, and adopts variable frequency operation to adjust the voltage gain. Therefore, the LLC resonance converter can achieve the function of stable voltage output. Based on the analysis of its soft switching characteristics, the synchronous rectification switch located on the secondary side of the LLC resonance converter is designed to have zero current cutoff to reduce the switching loss during transition and improve the conversion efficiency of the converter.

As shown in FIG. 1, in order to prevent a first synchronous rectification switch and a second synchronous rectification switch from being turned on at the same time, causing safety concerns such as a short circuit in the secondary side loop, the first synchronous rectification switch and the second synchronous rectification switch are designed to be turned on with a delay based on a dead time length DT.

However, under a condition where the load is large, the current value of the current IQ1 flowing through the first synchronous rectification switch and the current value of the current IQ2 flowing through the second synchronous rectification switch are also larger. Therefore, the current IQ1 flowing through the first synchronous rectification switch and the current IQ2 flowing through the second synchronous rectification switch are discharged to 0 ampere within a dead time length DT. Hence, the current IQ1 flowing through the first synchronous rectification switch and the current IQ2 flowing through the second synchronous rectification switch have current differences ST1 to ST4 that are not equal to 0 ampere within the dead time length DT. The first synchronous rectification switch and the second synchronous rectification switch cannot achieve zero current cutoff. The current differences ST1 to ST4 increase the switching loss, and thus the conversion efficiency cannot be optimized.

SUMMARY

The disclosure provides a resonance conversion device capable of achieving zero current cutoff under different loads.

The resonance conversion device of the disclosure includes an LLC synchronous resonance converter, a synchronous rectification controller, and a dead time adjustment circuit. The LLC synchronous resonance converter includes a resonance tank, a main transformer, and multiple synchronous rectification switches. The synchronous rectification controller is coupled to the LLC synchronous resonance converter and controls the multiple synchronous rectification switches. The multiple synchronous rectification switches are turned on with a delay based on a dead time length. The dead time adjustment circuit is coupled to the LLC synchronous resonance converter and the synchronous rectification controller. The dead time adjustment circuit inductively couples an electric energy at an output of the LLC synchronous resonance converter to the resonance tank, and provides a dead time control signal according to a resonance voltage variation of the resonance tank so that the synchronous rectification controller adjusts the dead time length according to the dead time control signal.

Based on the above, the dead time adjustment circuit inductively couples the electric energy at the output of the LLC synchronous resonance converter to the resonance tank, and provides the dead time control signal according to the resonance voltage variation of the resonance tank so that the synchronous rectification controller adjusts the dead time length according to the dead time control signal. The dead time adjustment circuit can provide a corresponding dead time length according to different loads. Therefore, the disclosure can achieve zero current cutoff under different loads. In this way, the conversion efficiency of the LLC synchronous resonance converter can be optimized under different loads.

In order to make the aforementioned features and advantages of the disclosure comprehensible, embodiments accompanied with drawings are described in detail as follows.

DESCRIPTION OF THE EMBODIMENTS

Figure 1:
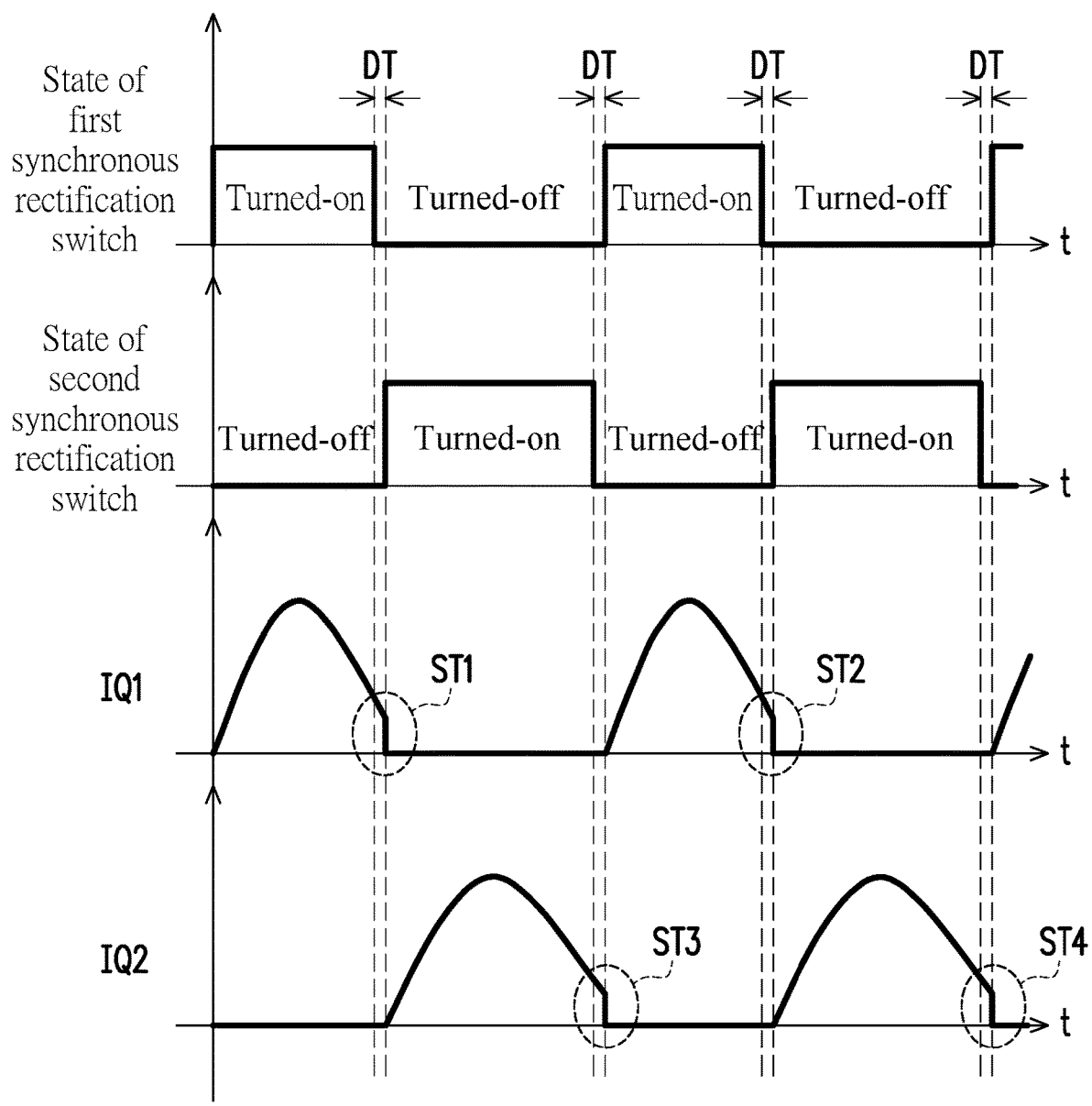
FIG. 1 is a schematic diagram showing that a first synchronous rectification switch and a second synchronous rectification switch cannot achieve zero current cutoff.

Some embodiments of the disclosure accompanied with drawings are described in detail as follows. The reference numerals used in the following description are regarded as the same or similar elements when the same reference numerals appear in different drawings. These embodiments are only a part of the disclosure, and do not disclose all the possible implementation modes of the disclosure. To be more precise, the embodiments are only examples in the scope of the claims of the disclosure.

Figure 2:
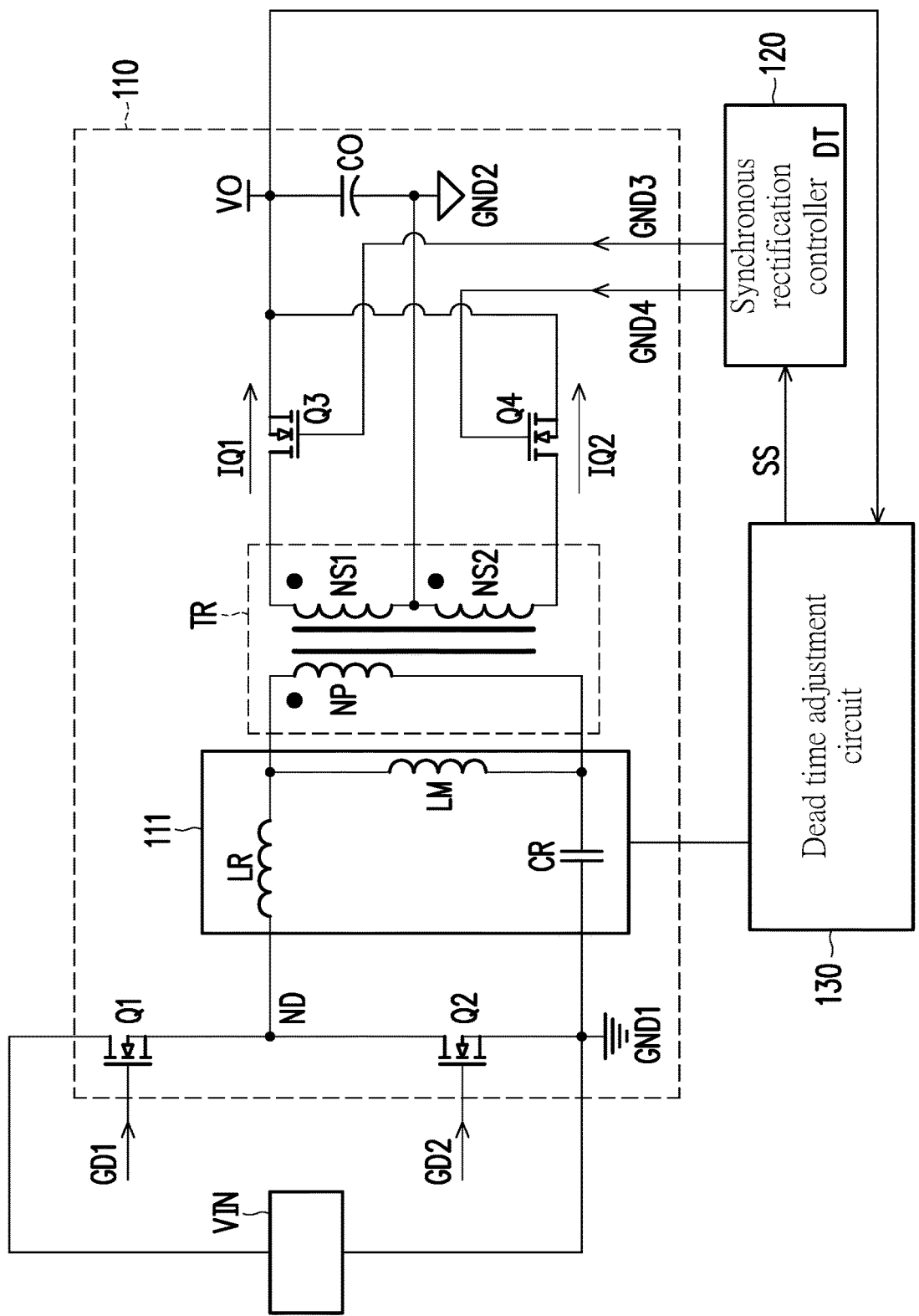
FIG. 2 is a schematic diagram of a resonance conversion device according to the first embodiment of the disclosure.

Please refer to FIG. 2, which is a schematic diagram of a resonance conversion device according to the first embodiment of the disclosure. In the embodiment, the resonance conversion device 100 includes an LLC synchronous resonance converter 110, a synchronous rectification controller 120, and a dead time adjustment circuit 130. The LLC synchronous resonance converter 110 includes power switches Q1 and Q2, a resonance tank 111, a main transformer TR1, synchronous rectification switches Q3 and Q4, and an output capacitor CO. The power switch Q1 performs a switching operation in response to a control signal GD1. The power switch Q2 performs a switching operation in response to a control signal GD2. The synchronous rectification controller 120 is coupled to the LLC synchronous resonance converter 110, and controls the synchronous rectification switches Q3 and Q4. In the embodiment, the synchronous rectification controller 120 provides control signals GD3 and GD4. The synchronous rectification switch Q3 performs a switching operation in response to the control signal GD3. The synchronous rectification switch Q4 performs a switching operation in response to the control signal GD4. In addition, under the control of the synchronous rectification controller 120, the synchronous rectification switches Q3 and Q4 are turned on with a delay based on a dead time length DT.

In the embodiment, the dead time adjustment circuit 130 is coupled to the LLC synchronous resonance converter 110 and the synchronous rectification controller 120. The dead time adjustment circuit 130 inductively couples an electric energy at an output of the LLC synchronous resonance converter 110 (i.e., output power VO) to the resonance tank 111, and provides a dead time control signal SS according to resonance voltage variation of the resonance tank 111. Therefore, the synchronous rectification controller 120 adjusts the dead time length DT according to the dead time control signal SS. The electrical energy at the output of the LLC synchronous resonance converter 110, a voltage of the resonance tank 111, and the dead time length DT are in a positive correlation. Taking the embodiment as an example, when the electric energy at the output of the LLC synchronous resonance converter 110 is greater, the voltage of the resonance tank 111 is greater. The dead time adjustment circuit 130 provides a dead time control signal SS for extending the dead time length DT. Therefore, the dead time length DT is extended. Moreover, when the electric energy at the output of the LLC synchronous resonance converter 110 is smaller, the voltage of the resonance tank 111 is smaller. The dead time adjustment circuit 130 provides a dead time control signal SS for shortening the dead time length DT. Therefore, the dead time length DT is shortened.

It is worth mentioning here that the electric energy at the output of the LLC synchronous resonance converter 110 is related to a load of the LLC synchronous resonance converter 110. The dead time adjustment circuit 130 inductively couples the electric energy at the output of the LLC synchronous resonance converter 110 to the resonance tank 111, and adjusts the dead time length DT according to the resonance voltage variation of the resonance tank 111. The dead time adjustment circuit 130 can control the synchronous rectification controller 120 to provide a corresponding dead time length DT according to different loads. Therefore, the synchronous rectification switches Q3 and Q4 can achieve zero current cutoff under different loads. In this way, the conversion efficiency of the LLC synchronous resonance converter 110 can be optimized under different loads.

Figure 3:
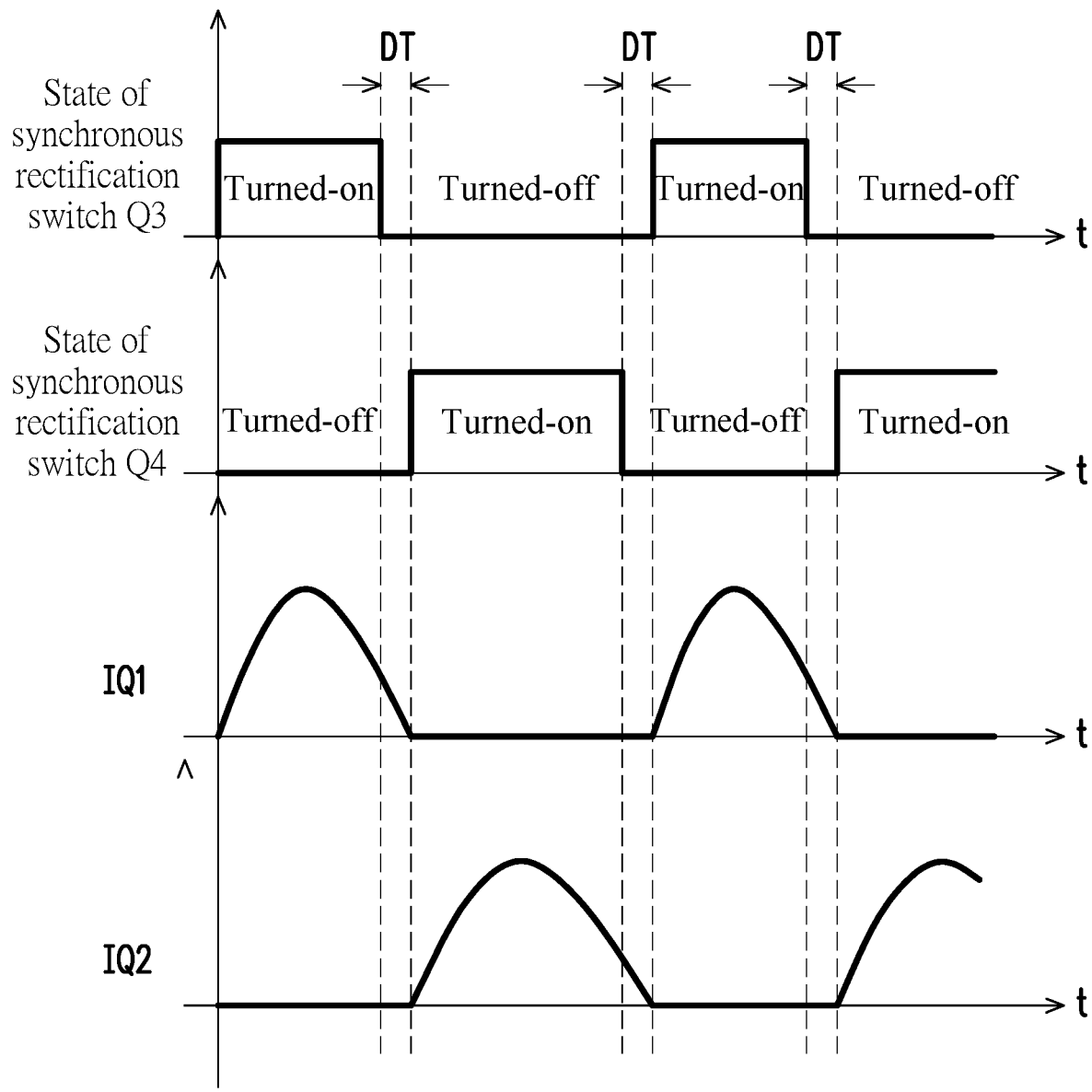
FIG. 3 is a schematic diagram of achieving zero current cutoff according to an embodiment of the disclosure.

Please refer to FIGS. 2 and 3 at the same time. FIG. 3 is a schematic diagram of achieving zero current cutoff according to an embodiment of the disclosure. In the embodiment, when the load of the LLC synchronous resonance converter 110 increases, the electric energy at the output of the LLC synchronous resonance converter 110 is greater. The current value of the current IQ1 flowing through the synchronous rectification switch Q3 and the current value of the current IQ2 flowing through the synchronous rectification switch Q4 are also greater. Therefore, compared to FIG. 1, the dead time length DT shown in FIG. 3 is extended. Based on the extension of the dead time length DT, the current IQ1 flowing through the synchronous rectification switch Q3 and the current IQ2 flowing through the synchronous rectification switch Q4 can resonate to 0 ampere within a sufficient dead time length DT. In this way, under large load, the synchronous rectification switches Q3 and Q4 can achieve zero current cutoff. Moreover, when the load of the LLC synchronous resonance converter 110 decreases, the dead time length DT shown in FIG. 3 is shortened.

Please refer to the embodiment of FIG. 2 again. In the embodiment, the first terminal of the power switch Q1 is coupled to an input power VIN. The second terminal of the power switch Q1 is coupled to a connection node ND. The control terminal of the power switch Q1 receives the control signal GD1. The first terminal of the power switch Q2 is coupled to the connection node ND. The second terminal of the power switch Q2 is coupled to a ground terminal GND1. The control terminal of the power switch Q2 receives the control signal GD2. The resonance tank 111 is coupled between the connection node ND and the ground terminal GND1. The resonance tank 111 includes a resonance inductor LR, a magnetizing inductor LM, and a resonance capacitor CR. The resonance inductor LR, the magnetizing inductor LM, and the resonance capacitor CR are coupled in series with each other. Furthermore, the resonance inductor LR is coupled between the connection node ND and the first terminal of the magnetizing inductor LM. The resonance capacitor CR is coupled between the second terminal of the magnetizing inductor LM and the ground terminal GND1.

In the embodiment, the main transformer TR1 includes a primary side winding NP and secondary side windings NS1 and NS2. The primary side winding NP is coupled in parallel to the magnetizing inductor LM. The first terminal of the secondary side winding NS1 is coupled to the first terminal of the synchronous rectification switch Q3. The second terminal of the secondary side winding NS1 is coupled to the first terminal of the secondary side winding NS2 and a ground terminal GND2. The second terminal of the synchronous rectification switch Q3 is configured as the output of the LLC synchronous resonance converter 110. The output is configured to provide the output power VO. The control terminal of the power switch Q3 receives the control signal GD3. The second terminal of the secondary side winding NS2 is coupled to the first terminal of the synchronous rectification switch Q4. The second terminal of the synchronous rectification switch Q4 is coupled to the second terminal of the synchronous rectification switch Q3. The control terminal of the power switch Q4 receives the control signal GD4. The output capacitor CO is coupled between the output of the LLC synchronous resonance converter 110 and the ground terminal GND2. The control signals GD1 and GD2 may be provided by a power switch controller (not shown). In some embodiments, the power switch controller and the synchronous rectification controller 120 may be integrated in a single controller.

In the embodiment, the LLC synchronous resonance converter 110 takes a half-bridge LLC synchronous resonance converter as an example. The disclosure is not limited thereto. In some embodiments, the LLC synchronous resonance converter 110 may be a full-bridge LLC synchronous resonance converter with four power switches.

Figure 4:
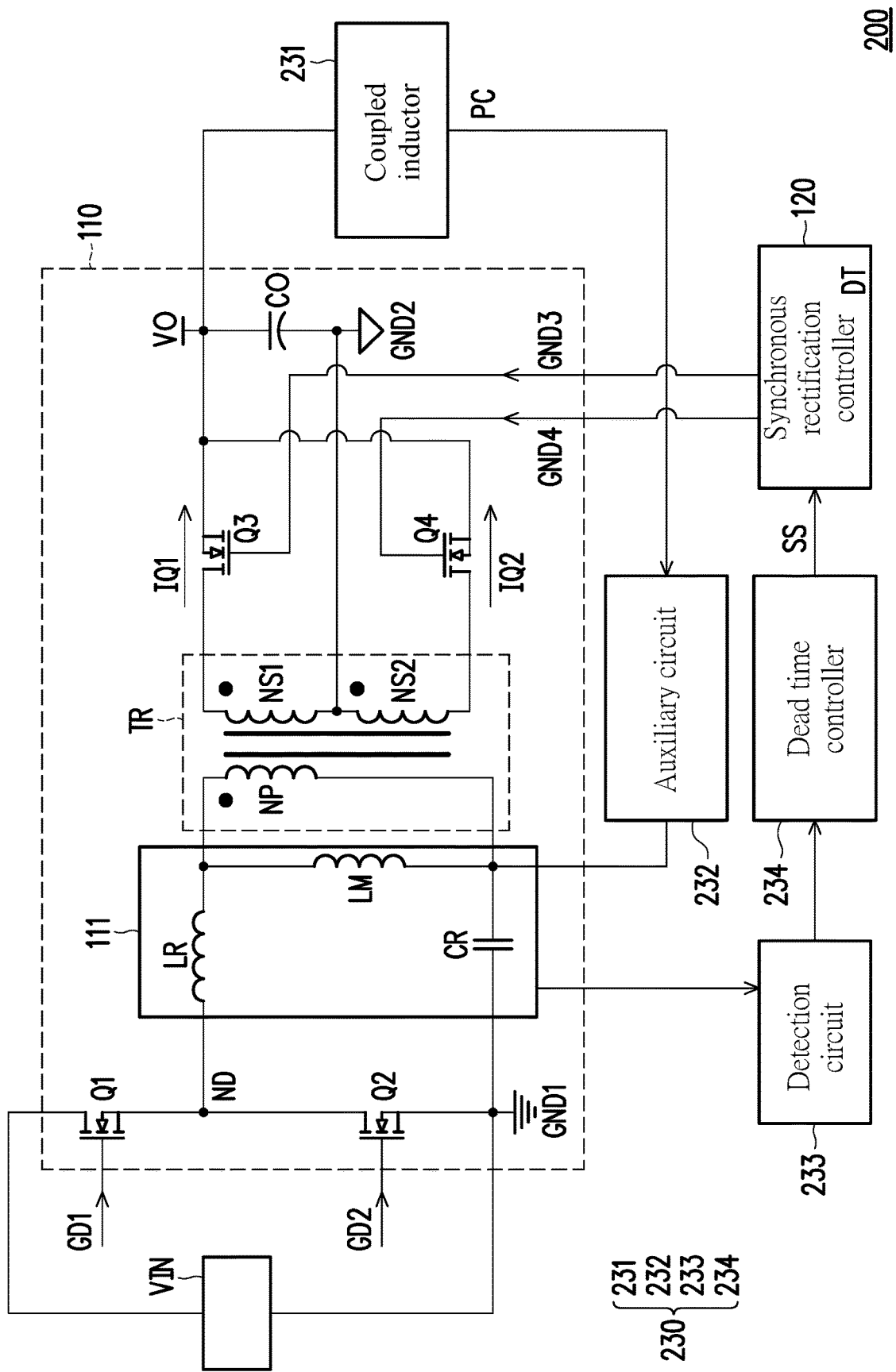
FIG. 4 is a schematic diagram of a resonance conversion device according to the second embodiment of the disclosure.

Please refer to FIG. 4, which is a schematic diagram of a resonance conversion device according to the second embodiment of the disclosure. In the embodiment, the resonance conversion device 200 includes an LLC synchronous resonance converter 110, a synchronous rectification controller 120, and a dead time adjustment circuit 230. The implementation modes of the LLC synchronous resonance converter 110 and the synchronous rectification controller 120 have been fully described in the embodiment of FIG. 2 and thus are not repeated here. In the embodiment, the dead time adjustment circuit 230 includes a coupled inductor 231, an auxiliary circuit 232, a detection circuit 233, and a dead time controller 234. The coupled inductor 231 is coupled to an output of the LLC synchronous resonance converter 110. The coupled inductor 231 uses inductive coupling to provide an inductive electric energy PC corresponding to electric energy at the output of the LLC synchronous resonance converter 110. The auxiliary circuit 232 is coupled to the coupled inductor 231 and a resonance tank 111. The auxiliary circuit 232 inductively couples the received inductive electric energy PC to the resonance tank 111.

In the embodiment, the detection circuit 233 is coupled to the resonance tank 111. Furthermore, a magnetizing inductor LM and a resonance capacitor CR form a series element group. The detection circuit 233 is coupled in parallel with the series element group. The detection circuit 233 provides a detection result of resonance voltage variation of the series element group. The dead time controller 234 is coupled to the detection circuit 233 and the synchronous rectification controller 120. The dead time controller 234 correspondingly provides a dead time control signal SS in response to the detection result.

Figure 5:
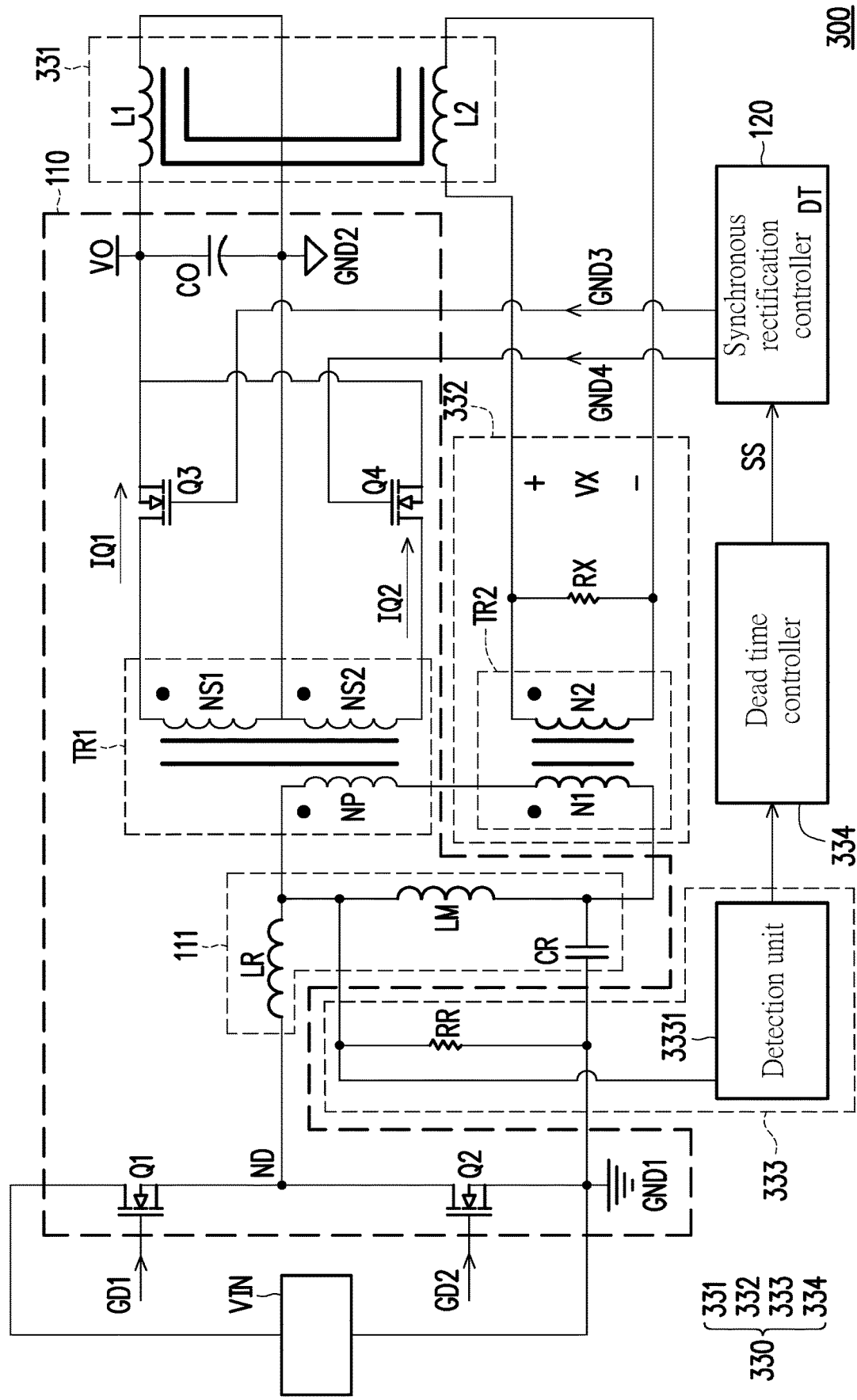
FIG. 5 is a schematic diagram of a circuit of a resonance conversion device according to an embodiment of the disclosure.

Please refer to FIG. 5, which is a schematic diagram of a circuit of a resonance conversion device according to an embodiment of the disclosure. In the embodiment, the resonance conversion device 300 includes an LLC synchronous resonance converter 110, a synchronous rectification controller 120, and a dead time adjustment circuit 330. The implementation modes of the LLC synchronous resonance converter 110 and the synchronous rectification controller 120 have been fully described in the embodiment of FIG. 2 and thus is not repeated here. In the embodiment, the dead time adjustment circuit 330 includes a coupled inductor 331, an auxiliary circuit 332, a detection circuit 333, and a dead time controller 334.

In the embodiment, the coupled inductor 331 includes inductors L1 and L2. The inductor L1 is coupled between an output of the LLC synchronous resonance converter 110 and a ground terminal GND2. The inductor L2 is coupled to the auxiliary circuit 332 and provides inductive electric energy. Furthermore, the coupled inductor 331 receives the electric energy at the output of the LLC synchronous resonance converter 110 through the first inductor L1, and inductively couples the energy on the inductor L1 to the inductor L2 by means of voltage synchronous induction. Therefore, the inductor L2 provides inductive electric energy.

In the embodiment, the auxiliary circuit 332 includes an auxiliary resistor RX and an auxiliary transformer TR2. The auxiliary resistor RX is coupled to the coupled inductor 331, and establishes a first induced voltage VX according to the inductive electric energy. Specifically, the auxiliary resistor RX is coupled in parallel to the inductor L2 of the coupled inductor 331. Therefore, the auxiliary resistor RX can absorb the inductive electric energy to establish the first induced voltage VX.

The auxiliary transformer TR2 is coupled to the coupled inductor 331. The auxiliary transformer TR2 transforms the first induced voltage VX to generate a second induced voltage. The auxiliary transformer TR2 includes auxiliary windings N1 and N2. The auxiliary winding N1 may be regarded as the primary side winding of the auxiliary transformer TR2. The auxiliary winding N2 may be regarded as the secondary side winding of the auxiliary transformer TR2. The auxiliary winding N2 is coupled in parallel to the auxiliary resistor RX and receives the first induced voltage VX. The auxiliary winding N1 generates a second induced voltage. Moreover, the auxiliary winding N1 is coupled in series with the primary side winding NP of the main transformer TR1 to form a winding string. It should be noted that the winding string is designed to be coupled in parallel with the magnetizing inductor LM of the resonance tank 111. The voltage difference across the winding string changes based on a change of the second induced voltage. Therefore, the change of the second induced voltage generated by the auxiliary winding N1 is related to the resonance voltage variation.

In the embodiment, the electric energy at the output of the LLC synchronous resonance converter 110, the second induced voltage, and the voltage difference across the magnetizing inductor LM are in a positive correlation. For example, when the electric energy at the output of the LLC synchronous resonance converter 110 is increased, the second induced voltage is correspondingly raised. Therefore, the voltage difference across the magnetizing inductor LM is correspondingly increased. Moreover, when the electric energy at the output of the LLC synchronous resonance converter 110 is reduced, the second induced voltage is correspondingly lowered. Therefore, the voltage difference across the magnetizing inductor LM is correspondingly reduced.

In the embodiment, the detection circuit 333 includes a detection resistor RR and a detection unit 3331. The detection resistor RR is coupled in parallel with the series element group formed by the magnetizing inductor LM and the resonance capacitor CR. Moreover, the detection resistor RR provides a resonance voltage value. The detection unit 3331 is coupled to the detection resistor RR and provides a change of the resonance voltage value to provide a detection result.

In the embodiment, the dead time controller 334 receives the detection result provided by the detection unit 3331, and in response to the detection result, provides a dead time control signal SS corresponding to the detection result. If the detection result indicates that the resonance voltage value is raised, the dead time controller 334 provides a dead time control signal SS for extending the dead time length DT. If the detection result indicates that the resonance voltage value is lowered, the dead time controller 334 provides a dead time control signal SS for shortening the dead time length DT.

It should be noted that in the embodiment, the coupled inductor 331 is disposed on the secondary side of the resonance conversion device 300. Therefore, the dead time adjustment circuit 330 can receive the electric energy at the output of the LLC synchronous resonance converter 110. In addition, the auxiliary circuit 332 couples the electric energy at the output of the LLC synchronous resonance converter 110 to the resonance tank 111. Therefore, the detection circuit 333 and the dead time controller 334 may be disposed on the primary side of the resonance conversion device 300. In this way, the volume of the secondary side of the resonance conversion device 300 may be reduced. In the embodiment, the number of turns of the auxiliary windings N1 and N2 has a relatively low number of turns, respectively, for example, less than 5 turns. Therefore, the auxiliary circuit 332 itself also has a smaller volume.

In summary, the dead time adjustment circuit inductively couples the electric energy at the output of the LLC synchronous resonance converter to the resonance tank, and provides a dead time control signal according to the resonance voltage variation of the resonance tank. The synchronous rectification controller adjusts the dead time length according to the dead time control signal. The dead time adjustment circuit can provide the corresponding dead time length according to different loads. Therefore, the disclosure can achieve zero current cutoff under different loads. In this way, the conversion efficiency of the LLC synchronous resonance converter can be optimized under different loads. In addition, the dead time adjustment circuit judges the resonance voltage variation on the primary side of the resonance conversion device, and provides a dead time control signal accordingly. Therefore, the volume of the secondary side of the resonance conversion device may be reduced.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A resonance conversion device, comprising:
    an LLC synchronous resonance converter comprising a resonance tank, a main transformer, and a plurality of synchronous rectification switches;
    a synchronous rectification controller coupled to the LLC synchronous resonance converter and configured to control the plurality of synchronous rectification switches, wherein the plurality of synchronous rectification switches are turned on with a delay based on a dead time length; and
    a dead time adjustment circuit coupled to the LLC synchronous resonance converter and the synchronous rectification controller, configured to inductively couple an electric energy at an output of the LLC synchronous resonance converter to the resonance tank, and providing a dead time control signal according to a resonance voltage variation of the resonance tank for allowing the synchronous rectification controller to adjust the dead time length according to the dead time control signal.

2. The resonance conversion device according to claim 1, wherein the electric energy at the output of the LLC synchronous resonance converter, a voltage of the resonance tank, and the dead time length are in a positive correlation.

3. The resonance conversion device according to claim 1, wherein:
    the resonance tank comprises a resonance inductor, a magnetizing inductor, and a resonance capacitor coupled in series, and
    the dead time adjustment circuit comprises:
        a detection circuit coupled in parallel with a series element group formed by the magnetizing inductor and the resonance capacitor, and configured to provide a detection result of the resonance voltage variation of the series element group; and
        a dead time controller coupled to the detection circuit and the synchronous rectification controller, and configured to provide the dead time control signal in response to the detection result.

4. The resonance conversion device according to claim 3, wherein the detection circuit comprises:
    a detection resistor coupled in parallel with the series element group formed by the magnetizing inductor and the resonance capacitor, and configured to provide a resonance voltage value; and
    a detection unit coupled to the detection resistor, and configured to provide a change in the resonance voltage value to provide the detection result.

5. The resonance conversion device according to claim 1, wherein the dead time adjustment circuit comprises:
    a coupled inductor coupled to the output of the LLC synchronous resonance converter, and configured to provide an inductive electric energy corresponding to the electric energy at the output of the LLC synchronous resonance converter by inductive coupling; and
    an auxiliary circuit coupled to the coupled inductor and the resonance tank, and configured to inductively couple the inductive electric energy to the resonance tank.

6. The resonance conversion device according to claim 5, wherein the coupled inductor comprises:
    a first inductor coupled between the output of the LLC synchronous resonance converter and a secondary side ground terminal; and
    a second inductor coupled to the auxiliary circuit and configured to provide the inductive electric energy.

7. The resonance conversion device according to claim 6, wherein the coupled inductor receives the electric energy at the output of the LLC synchronous resonance converter through the first inductor, and inductively couples an energy on the first inductor to the second inductor by means of voltage synchronous induction so that the second inductor provides the inductive electric energy.

8. The resonance conversion device according to claim 5, wherein the auxiliary circuit comprises:
    an auxiliary resistor coupled to the coupled inductor and configured to establish a first induced voltage according to the inductive electric energy; and
    an auxiliary transformer coupled to the coupled inductor and configured to transform the first induced voltage to generate a second induced voltage.

9. The resonance conversion device according to claim 8, wherein the auxiliary transformer comprises:
    a first auxiliary winding coupled in parallel to the auxiliary resistor and configured to receive the first induced voltage; and
    a second auxiliary winding coupled in series with a primary side winding of the main transformer to form a winding string, and configured to generate the second induced voltage, wherein
    the winding string is coupled in parallel with an magnetizing inductor of the resonance tank, and
    a change of the second induced voltage is related to the resonance voltage variation.

10. The resonance conversion device according to claim 9, wherein the electric energy at the output of the LLC synchronous resonance converter, the second induced voltage, and a voltage difference across the magnetizing inductor are in a positive correlation.

* * * * *